Jan. 31, 1933.  J. F. PUTNAM  1,895,643

METHOD OF AND APPARATUS FOR MEASURING THE THICKNESS OF METAL

Filed March 5, 1929

Inventor
Joseph F. Putnam
By Lyon & Lyon
Attorneys

Patented Jan. 31, 1933

1,895,643

UNITED STATES PATENT OFFICE

JOSEPH F. PUTNAM, OF BERKELEY, CALIFORNIA, ASSIGNOR TO STANDARD OIL COMPANY OF CALIFORNIA, OF SAN FRANCISCO, CALIFORNIA, A CORPORATION OF DELAWARE

METHOD OF AND APPARATUS FOR MEASURING THE THICKNESS OF METAL

Application filed March 5, 1929. Serial No. 344,233.

This invention relates to apparatus for determining the thickness of metals, and it relates, more especially, to an apparatus that determines the thickness of metals by measuring the resistance to the flow of electric current between two points on one surface of the metal.

The invention also relates to methods for determining the thickness of metals, and an object of the invention is to determine the thickness by a comparatively simple method.

Another object is to make provision for determining the thickness of metals when only one surface of the metal can be reached by the measuring instrument. Thus, I am enabled to measure the thickness of pipes, tubes, boilers, and other hollow metal members without cutting or drilling a hole through the metal and without the use of micrometers of the sort which require that both surfaces of the metal be reached by the micrometer.

Other objects and advantages will appear in the subjoined detailed description.

The accompanying drawing illustrates the invention:

Figure 1:
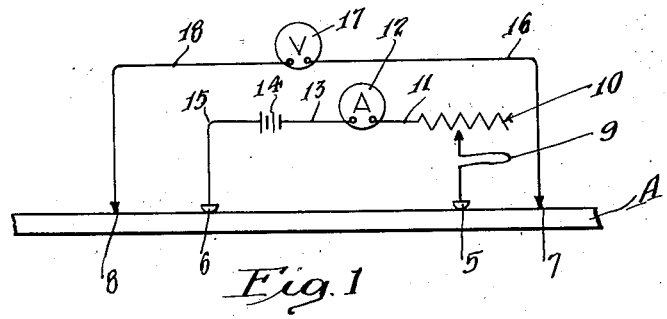
Fig. 1 is a diagrammatic view of an apparatus constructed in accordance with the provisions of this invention.

Referring to the drawing, there are provided a number of contact members or electrodes 5, 6, 7, 8. The contact members may be made of any suitable metal, for example, copper, and the contact members 5, 6 are preferably in the form of buttons. The contact members 7, 8 are pointed, in this instance. The contact member 5 is connected by a wire 9 to a variable resistance 10 which, in turn, is connected by a wire 11 to one pole of a current measuring instrument 12 such, for example, as an ammeter. The other pole of the instrument 12 is connected by a wire 13 to one pole of a source 14 of electric current.

I prefer to employ a source of uni-directional current because of the difficulty in measuring small alternating potentials. The other pole of the electric current source 14 is connected by a wire 15 to the contact member 6.

Figure 2:
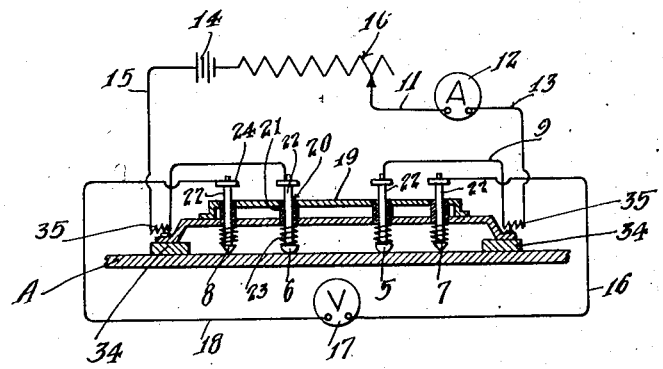
Fig. 2 is a view partly in section and partly diagrammatic of the apparatus shown in Fig. 1.

The contact member 7 is connected by a wire 16 to one pole of an instrument 17 for measuring differences of potential. The instrument 17 may be, for example, a voltmeter, potentiometer or similar instrument. To avoid the effects of variable contact resistance at the points of contact of the contact members 7, 8 with the metal A, the instrument 17 is preferably a potentiometer, but it is to be understood that a high resistance voltmeter or an equivalent instrument may be used without departing from the spirit of the invention. The other pole of the instrument 17 is connected by a wire 18 to the contact member 8. All the elements hereinabove described are indicated in Fig. 1 and the apparatus is illustrated more in detail in Fig. 2. Referring, more particularly, to Fig. 2, a means is shown for maintaining the contacts 5, 6, 7, 8 at predetermined distances from one another. This means, in this instance, comprises a holder or support 19 in which are vertical openings 20. Electrical insulation bushings 21 are secured in the openings 20. The contact members 5, 6, 7, 8 are provided, respectively, with stems 22 which slidably engage the bushings 21 and project above and below said bushings.

The lower projecting ends of the stems 22 are provided with coil springs 23 which tend to yieldingly hold the contact members against the surface of the metal that is to be measured, such metal being indicated at A. The stems 22 are provided near this upper ends with heads 24 so as to limit downward movement of the stems with respect to the holder 19. This form of the invention is well adapted to measure the thickness of members having either flat or curved surfaces. For example, it may be used on the exterior of pipes, tubes, boilers and the like to measure the thickness thereof.

Figure 3:
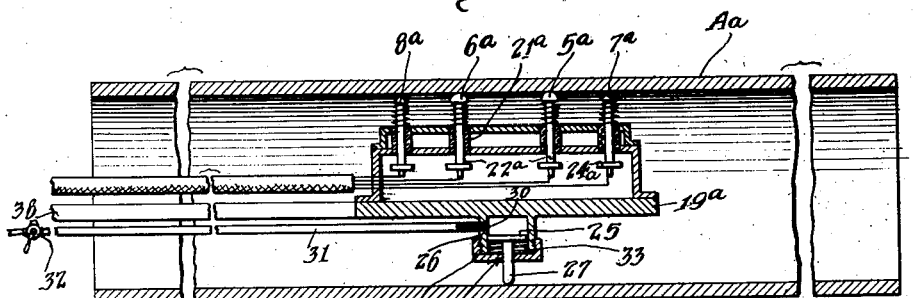
Fig. 3 is a modified form of the apparatus shown in Fig. 2.

In Fig. 3 is illustrated a variation of the invention which is well adapted for inserting in tubular metal members for measuring the thickness thereof. This may be desirable, for example, in the case of pipes embedded in the earth where it is impossible to externally apply the measuring apparatus. In the form of the invention illustrated in Fig. 3, the elements, that correspond in function to those described above, are indicated by the same reference characters with the addition of the letter *a*. This apparatus is the same as described above excepting that it is provided with a means for yieldingly pressing the holder toward that side of the tubular member A*a* that is engaged by the contacts 5*a*, 6*a*, 7*a*, 8*a*. This means may be of any suitable construction and, in this instance, comprises a plunger 25 working in a cylinder 26. The plunger 25 is provided with a stem or arm 27 that passes through an opening 28 in the head 29 of the cylinder 26.

The cylinder 26 is provided with a port 30 which communicates through a tube 31 with a suitable source of fluid under pressure. The pipe line 31 is provided with a 3-way valve 32 whereby to control the flow of fluid to and from the cylinder and exhaust a fluid therefrom. When the 3-way valve 32 is turned to a position to exhaust the fluid from the pipe line 31, a coil spring 33, positioned between the plunger 25 and head 29, forces the plunger 25 inwardly to retract the stem 27.

The invention operates as follows: The apparatus is placed with the contact members, 5, 6, 7, 8 in electric contact with the surface of the metal A, of which the thickness is to to be measured. The contact members are held in fixed position, with respect to one another, by the holder 19, and the current flows through the metal A between the contact members 5, 6. The resistance 10 is then adjusted until the reading on the instrument 12 reaches a predetermined figure obtained by experiment and differing for each kind of metal of which the thickness is to be determined. Thus, if the material whose thickness is to be measured is, for example, iron, a preliminary calibration for iron, having been made, has shown that a certain definite current is necessary for the purpose. I prefer to mark this current value with a red line on the ammeter. In using the equipment the potentiometer, or other potential measuring instrument, is balanced to a standard battery cell by varying its current in the usual manner.

The contact device is then placed in position on the material whose thickness is to be measured and the rheostat 10, Figure 1, adjusted until the hand of the ammeter A reaches the red line. The potential value between contacts 7 and 8 is then read on the potentiometer 17 in terms of the thickness of the metal. While I have mentioned the use of a red line on the ammeter to represent the current value for iron, there may, of course, be several such lines representing the current values for various alloys, pipe sizes, etc. The reading on the instrument 17 is then taken. By a proper calibration of the instrument 17, the thickness of the metal member A may be read directly from the instrument 17. If the instrument 17 is calibrated in the usual manner, it indicates the potential difference, between the contact members 7, 8, caused by current from the electric current source 14 flowing through the metal A.

If the instrument 17 is calibrated so as to directly indicate the thickness of the metal, the reading of the instrument 12 should vary with different metals. When, therefore, the dial of the instrument 17 is calibrated directly in terms of thickness of metal, the strength of currents to be used for the different metals that are to be measured should be predetermined by experiment. For very accurate work it is necessary that the strength of the electric current should be changed slightly in accordance with the extent of surface available for carrying the current between the electrodes 5, 6. For example, in measuring the thickness of pipes of various diameters, a slightly different strength of current may be used for each diameter.

Figure 4:
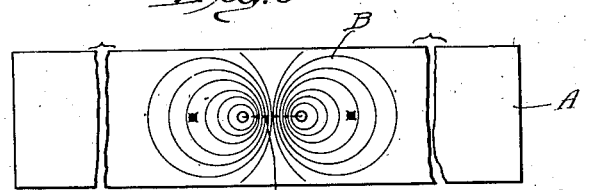
Fig. 4 is a diagrammatic view illustrating the arrangement of the contacts with respect to the electric equipotential lines.

It will be noted that, in the drawing, the potential contact members 7, 8 are positioned beyond or outside of the current contact members 5, 6. This is practically necessary because, with such relation of the contact members, slight variations in the point of actual contact of the current contact members 5, 6, with the metal will have less effect on the accuracy of determination of the thickness since the equipotential lines B (see Fig. 4) are closest together along a line C connecting said contact members 5, 6. The equipotential lines B are increasingly further apart beyond or outside of the contact members 5, 6.

While the potential contact members 7, 8 may be made of any suitable material, such as copper, which is a good conductor of electricity, I prefer to make them of the same metal as that which is to be measured, because the resistance at the current contact members 5, 6 may set up heating effects which will cause thermo-potentials between the contact members 7, 8 and the metal A if the potential contact members 7, 8 are not of the same metal as that being measured.

In the form of the invention illustrated in Fig. 2, I have provided a convenient means for clamping the holder to the work and said means, in this instance, comprises magnets 34 rigidly secured to the holder 19 and energized by current flowing through the coils 35 which are connected in the lines 9, 18.

When it is desired to measure the thickness of metal of a pipe Aa, or other tubular member, the outer surface of which cannot be reached conveniently, the form of the invention illustrated in Fig. 3 will be inserted in the pipe. Before inserting the apparatus, the valve 32 will be in a position to permit the spring 33 to hold the stem 27 retracted.

After the apparatus has been inserted to the position where the measurement is to be made, the valve 32 will be operated to admit fluid pressure to the cylinder 26, thus forcing the stem 27 against the inner face of the pipe, to thereby hold the contact members against the opposite inner face of the pipe. The holder 19a may be readily inserted any desired distance into the pipe by a suitable handle 36 that is secured to the holder.

I claim:

1. An apparatus of the character described comprising a source of electric current, current contact members connected with said source and spaced a predetermined distance apart, a means for measuring the flow of current from said source, potential contact members spaced apart a fixed distance from each other and from the current contact members, said potential contact members being positioned outside of the current contact members, and a means for measuring the potential between the potential contacts.

2. The method of measuring the thickness of metal consisting in applying an electric current to the metal between two points on the metal having a fixed relation to complete a circuit through that portion of the plate lying between said points, imposing resistance in said circuit to a predetermined value, and then ascertaining the potential value between two other points on the metal separated a greater distance than the points to which current is applied.

3. The method of measuring the thickness of metal consisting in applying an electric current to the metal between two points on the metal having a fixed relation to complete a circuit through that portion of the plate lying between said points, imposing resistance in said circuit to a predetermined value, and then ascertaining the potential value between two other points on the metal having a fixed relation to the first mentioned points and separated a greater distance apart than said first mentioned points.

4. The method of measuring the thickness of metal consisting in predetermining a current value for the particular kind of metal that is to be measured, applying an electric current to the metal between two points on the metal having a fixed relation to complete a circuit through that portion of the plate lying between said points, imposing resistance in said circuit until the current is equal to the predetermined value, and then ascertaining the potential value between two other points on the metal spaced a greater distance apart than the first mentioned points.

5. The method of measuring the thickness of metal consisting in predetermining a current value for the particular kind of metal that is to be measured, applying an electric current to the metal between two points on the metal having a fixed relation to complete a circuit through that portion of the plate lying between said points, imposing resistance in said circuit to a predetermined value, and then ascertaining the potential value between two other points on the metal in alignment with said first mentioned points and spaced a greater distance apart than said first mentioned point.

6. An apparatus for measuring the thickness of metals comprising two spaced current contact members, means for supplying electrical current to said current contact members, potential contact members spaced apart a greater distance than said current contact members, and means operably connected to said potential contact members for measuring the potential between said potential contacts.

7. An apparatus for measuring the thickness of metals comprising two spaced current contact members, means for supplying electrical current to said current contact members, potential contact members spaced apart a distance greater than the distance between said current contact members, said potential contact members being equally spaced from adjacent respective current contact members, and means operably connected to said potential contact members for measuring the potential between the same.

8. An apparatus for measuring the thickness of metals comprising four spaced contact members in alignment, means for supplying electrical current to the two inner contact members, and means operably connected to the outer contact members for measuring the potential therebetween.

9. An apparatus for measuring the thickness of metal comprising a holder means, two spaced current contact members carried by the holder means, two potential contact members carried by the holder means, said potential contact members being spaced apart a greater distance than said current contact members, means for supplying electrical current to said current contact members, and means operably connected to said potential contact members for measuring the potential therebetween.

10. An apparatus for measuring the thickness of metal comprising a holder means, two spaced current contact members carried by the holder means, two potential contact members carried by the holder means, said potential contact members being spaced apart a greater distance than said current contact members, means for supplying electrical current to said current contact members, means operably connected to said potential contact members for measuring the potential therebetween, and means for urging said current contact members and potential contact members into operative contact with metal to be tested.

11. An apparatus for measuring the thickness of metal comprising a holder means, two spaced current contact members carried by the holder means, two potential contact members carried by the holder means, said potential contact members being spaced apart a greater distance than said current contact members, means for supplying electrical current to said current contact members, means operably connected to said potential contact members for measuring the potential therebetween, and electromagnetic means carried by said holder means for holding said holder means in contact with metal to be tested.

Signed at Richmond, Cal., this 25th day of February 1929.

JOSEPH F. PUTNAM.